(12) United States Patent
Bücker et al.

(10) Patent No.: US 9,377,554 B2
(45) Date of Patent: Jun. 28, 2016

(54) PORE PARAMETERS AND HYDRAULIC PARAMETERS FROM ELECTRIC IMPEDANCE SPECTRA

(75) Inventors: Matthias Bücker, Deidesheim (DE);
Andreas Hördt, Braunschweig (DE);
Christian Fulda, Sehnde (DE)

(73) Assignee: BAKER HUGHES INCORPORATED, Houston, TX (US)

( * ) Notice: Subject to any disclaimer, the term of this patent is extended or adjusted under 35 U.S.C. 154(b) by 775 days.

(21) Appl. No.: 13/603,029

(22) Filed: Sep. 4, 2012

(65) Prior Publication Data

US 2013/0066556 A1    Mar. 14, 2013

Related U.S. Application Data

(60) Provisional application No. 61/532,908, filed on Sep. 9, 2011.

(51) Int. Cl.
*G01V 3/00* (2006.01)
*G01V 3/24* (2006.01)

(52) U.S. Cl.
CPC .......................... *G01V 3/24* (2013.01)

(58) Field of Classification Search
CPC ........................................................ G01V 3/24
USPC .............................................................. 702/2
See application file for complete search history.

(56) References Cited

U.S. PATENT DOCUMENTS

| | | | |
|---|---|---|---|
| 4,217,193 A | 8/1980 | Rilbe | |
| 4,398,151 A | 8/1983 | Vinegar et al. | |
| 4,506,226 A | 3/1985 | Luce et al. | |
| 4,743,854 A | 5/1988 | Vinegar et al. | |
| 4,912,417 A | 3/1990 | Gibboney et al. | |
| 5,005,406 A | 4/1991 | Jasinski et al. | |
| 5,825,188 A | 10/1998 | Montgomery et al. | |
| 6,711,502 B2 | 3/2004 | Mollison et al. | |
| 6,885,960 B2 * | 4/2005 | Wagner et al. | 702/108 |
| 7,373,813 B2 | 5/2008 | DiFoggio | |
| 2008/0164409 A1 * | 7/2008 | Schultz et al. | 250/282 |
| 2008/0314139 A1 | 12/2008 | DiFoggio | |
| 2009/0326825 A1 * | 12/2009 | LeCompte et al. | 702/8 |
| 2012/0209527 A1 * | 8/2012 | Gorek | G01V 3/24 702/7 |
| 2013/0261972 A1 * | 10/2013 | Al Adani | 702/7 |

OTHER PUBLICATIONS

Lesmes, David P., et al., "Influence of pore fluid chemistry on the complex conductivity and induced polarization responses of Berea sandstone," Jnl of Geophysical Research, vol. 106, No. B3, pp. 4079-4090 (Mar. 10, 2001).

(Continued)

*Primary Examiner* — Bryan Bui
(74) *Attorney, Agent, or Firm* — Mossman Kumar & Tyler PC

(57) ABSTRACT

The present disclosure relates to methods and apparatuses for estimating electrical impedance spectra and pore parameters. The method may include estimating electrical impedance spectra using an estimated average ion concentration in pores within an earth formation. The method may also include estimating electrical impedance information about the earth formation; and estimating at least one parameter of interest by comparing the electrical impedance information with the estimated electrical impedance spectra. The apparatus may include at least one processor. The apparatus may also include an electrical impedance tool configured for use in a borehole.

21 Claims, 3 Drawing Sheets

(56) References Cited

OTHER PUBLICATIONS

Slater, Lee et al., "Electrical-hydraulic relationships observed for unconsolidated sediments," Water Resources Research, vol. 38, No. 10, 1213 doi: 10.1029/2001WR001075 (2002).

Weller, Andreas et al., "On the estimation of specific surface per unit pore volume from induced polarization: A robust empirical relation fits multiple data sets," Geophysics, vol. 75, No. 4 (Jul.-Aug. 2010).

Weller, Andreas et al., "Estimating permeability of sandstone samples by nuclear magnetic resonance and spectral-induced polarization," Geophysics, vol. 75, No. 6 (Nov.-Dec. 2010).

* cited by examiner

PORE PARAMETERS AND HYDRAULIC PARAMETERS FROM ELECTRIC IMPEDANCE SPECTRA

CROSS-REFERENCE TO RELATED APPLICATION

This application claims priority from U.S. Provisional Patent Application Ser. No. 61/532,908, filed on 9 Sep. 2011, and incorporated by reference herein in its entirety.

BACKGROUND OF THE DISCLOSURE

1. Field of the Disclosure

This disclosure generally relates to exploration and production of hydrocarbons involving investigations of regions of an earth formation penetrated by a borehole.

2. Description of the Related Art

Electrical earth borehole logging is well known to persons having an ordinary level of skill in the art, and various devices and various techniques have been described for this purpose. Broadly speaking, there are two categories of electrical logging apparatuses. In the first category, one or more measurement electrodes—current source(s) or sink(s)—are used in conjunction with a return electrode (which may be a diffuse electrode such as a logging tool's body or mandrel). A measurement current flows in a circuit that connects a current source to the measurement electrode(s), through the earth formation to the return electrode, and back to the current source in the tool. In a second category, that of inductive measuring tools, an antenna within the measuring instrument induces a current flow within the earth formation. The magnitude of the induced current is detected using either the same antenna or a separate receiver antenna. The present disclosure may be applied to both categories.

Spectral induced polarization (SIP) is a geophysical measurement method for determining the complex electrical impedance of an earth formation. SIP typically involves injecting an electrical current into the earth formation using one or more electrodes and measuring the voltage between one or more additional electrodes.

SUMMARY OF THE DISCLOSURE

In view of the foregoing, the present disclosure is directed to a method and apparatus for estimating electrical impedance spectra of an earth formation using estimated ion concentration distributions.

One embodiment according to the present disclosure includes a method of estimating electrical impedance spectra of an earth formation, comprising: estimating the electrical impedance spectra using at least one processor and estimated average ion concentrations in pores within the earth formation.

Another embodiment according to the present disclosure includes a method of estimating at least one parameter of interest of an earth formation, comprising: estimating the at least one parameter of interest using electrical impedance information obtained using a sensor in a borehole penetrating the earth formation and estimated average ion concentrations in pores of the earth formation.

Another embodiment according to the present disclosure includes an apparatus for estimating at least one parameter of interest of an earth formation, comprising: a carrier configured for conveyance in a borehole penetrating the earth formation; a electrode pair disposed on the carrier and configured to apply an electric current to the earth formation; a power supply in electrical communication with the electrode pair and configured to generate the electric current; a sensor associated with the electrode pair and configured to estimate an electrical impedance information of the earth formation; at least one processor configured to estimate the at least one parameter of interest using the electrical impedance information and estimated average ion concentrations in pores of the earth formation.

Another embodiment according to the present disclosure includes a non-transitory computer-readable medium product having stored thereon instructions that, when executed by at least one processor, perform a method, the method comprising: estimating at least one parameter of interest of an earth formation using electrical impedance information obtained using a sensor in a borehole penetrating the earth formation and estimated average ion concentrations in pores of the earth formation.

BRIEF DESCRIPTION OF THE DRAWINGS

The present disclosure is best understood with reference to the accompanying figures in which like numerals refer to like elements and in which.

DETAILED DESCRIPTION OF THE DISCLOSURE

Figure 1:
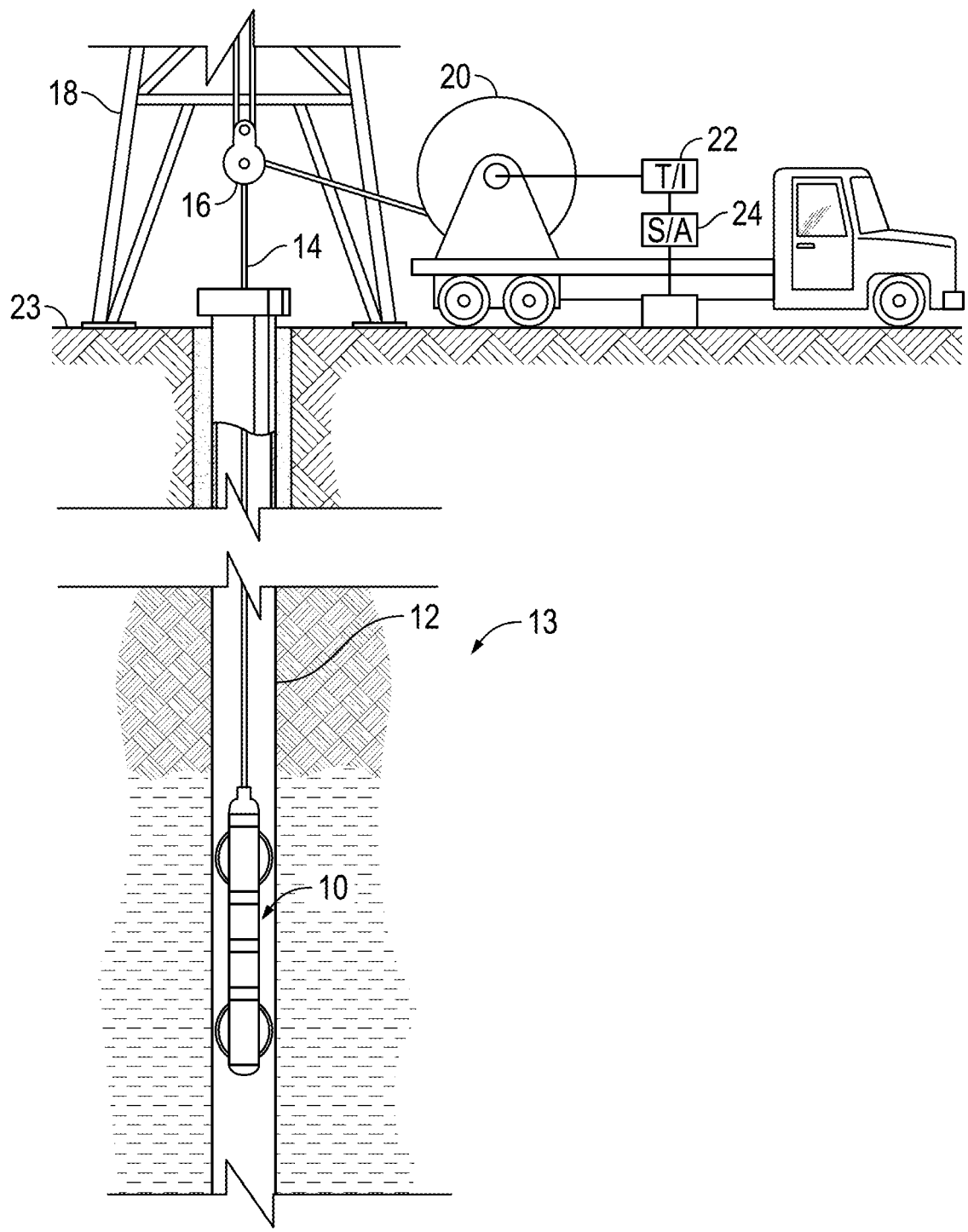
FIG. 1 is a schematic of a borehole including an electrical impedance tool for estimating a parameter of interest in an earth formation according to one embodiment of the present disclosure.

In the disclosure that follows, in the interest of clarity, not all features of actual implementations are described. It will of course be appreciated that in the development of any such actual implementation, as in any such project, numerous engineering and technical decisions must be made to achieve the developers' specific goals and subgoals (e.g., compliance with system and technical constraints), which will vary from one implementation to another. Moreover, attention will necessarily be paid to proper engineering and programming practices for the environment in question. It will be appreciated that such development efforts may be complex and time-consuming, outside the knowledge base of typical laymen, but would nevertheless be a routine undertaking for those of ordinary skill in the relevant fields.

The electrical impedance of fluid-filled rocks and sediments may depend on the geometry of the pore space. It is possible to simulate electrical impedance spectra for an earth formation using a pore model and average ion concentration information. Herein, the term "information" relates to, but is not limited to, at least raw data, processed data, and signals. Further, it is possible to estimate pore parameters and hydraulic properties from electrical impedance measurements. These pore parameters may include, but are not limited to, one or more of: (i) pore size, (ii) permeability, (iii) pore size distribution, (iv) specific surface area, (v) grain size, (vi) grain size distribution, (vii) cation exchange capacity, (viii) electric permittivity, and (ix) water saturation. The basis for the determination of pore parameters may include theoretical models which relate pore size to electrical impedance.

The measurement of the electrical impedance may be carried out in the frequency domain or in the time domain. In the frequency domain, electrical impedance measurement may be carried out at various frequencies, such that magnitude and phase shift are obtained as a function of frequency, called a spectrum. Alternatively, in the time domain, electrical impedance measurement may be carried out when a current step or current pulse is injected, and current and voltage are measured vs. time instead of frequency. The spectrum can be obtained through a mathematical transform, including, but not limited to, a Fourier transform.

A porous medium may be mathematically described by a parameter distribution of base pore geometries (e.g. cylinders or spheres). A physical model to explain electrical impedance spectra for a formation may use alternating zones characterized by different ion mobilities for positive $\mu_p$ and negative $\mu_n$ ions. The different ion mobilities in different zones may each vary along each pore of the porous medium. These varying ion mobilities may be related to the geometry or the radius of a pore using a mathematical equation. As such, the underlying differential equations describing the ion concentrations and electrical potentials become one dimensional. An electrical impedance spectrum $Z(\omega)$ using a one dimensional model of pore spaces consisting of 2 pores (numbered i=1,2) of length $\Delta L_1$ and $\Delta L_2$ with different mobilities of positive and negative ions $\mu_{pi}$, $\mu_{ni}$ may be generally expressed as:

$$Z(\omega) = \frac{\Delta L_1}{\mu_{p1} c_0 F}\left[t_{p1} + \frac{B}{A}t_{p2} + \frac{(S_2 - S_1)^2}{\frac{X_1 S_1}{(t_{p2})^2 t_{p1} \tanh X_1} + \frac{A}{B}\frac{X_2 S_2}{t_{p2}(t_{p1})^2 \tanh X_2}}\right] \quad (1)$$

where $c_0$ is the equilibrium ion concentration (which is the same for both types of ions), and F is Faraday's constant. Parameter A is a purely geometrical parameter defined by the ratio of the lengths of the two pores:

$$A = \frac{\Delta L_1}{\Delta L_2}, \quad (2)$$

B is the ratio between the diffusion coefficients $D_{p1}$ and $D_{p2}$ of positive ions in the two zones:

$$B = \frac{D_{p1}}{D_{p2}} \quad (3)$$

Eqn. (1) may be modified, as understood by one of skill in the art, to accommodate for the effects of electrode configuration and/or tool geometry when performing SIP using a tool downhole to estimate electrical impedance spectra of an earth formation.

In traditional pore models, impedance may depend on the ion mobilities through the transference numbers $t_{pi}$ and $t_{ni}$ (the index i denotes the two media):

$$t_{pi} = \frac{\mu_{pi}}{\mu_{pi} + \mu_{ni}} \quad t_{ni} = \frac{\mu_{ni}}{\mu_{pi} + \mu_{ni}} \quad (4a, b)$$

$S_1$ and $S_2$ are the ratios of the transference numbers:

$$S_i = \frac{t_{ni}}{t_{pi}} \quad (5)$$

and parameter X, is defined by:

$$X_i = \left(\frac{j\omega}{2D_{pi}t_{ni}}\right)^{\frac{1}{2}}\frac{\Delta L_i}{2} \quad (6)$$

where $j=\sqrt{-1}$.

It is important to note that the only geometrical pore parameters in the equation are the lengths of the different zones $\Delta L_1$ and $\Delta L_2$, but Z does not depend on the pore radii. However, in order to derive hydraulic parameters, pore parameters such as pore radii or specific surface may also be considered.

The term "electrical double layer" (EDL) may be used to describe the variation of anion and cation concentration in a pore fluid with distance from the surface of the mineral grain. Since the surface of a mineral grain is charged (normally negative), the distribution of ions in the vicinity of the mineral grain may become inhomogeneous. Thus, compared to the equilibrium state, there may be a surplus of cations and a deficit of anions. The EDL may be considered to be essential in causing the electrical impedance spectrum.

The calculation of ion concentration with distance from the mineral surface may be based on the electrical potential. For a cylindrical pore, the potential may be expressed as:

$$\phi(r) = \phi_0 \frac{J_0(i\kappa r)}{J_0(i\kappa r_0)} \quad (7)$$

where $\phi_0$ is the potential at the surface of the mineral grain, $J_0$ is the zero order Bessel function, $r_0$ is the radius of the pore, r is the distance to the pore wall, and $\kappa$ is defined by:

$$\kappa^2 = \frac{2c_0 e^2}{\varepsilon \varepsilon_0 k_B T} \quad (8)$$

where e is the elementary charge, $\epsilon_0$ and $\epsilon$ are the electrical permittivity of the vacuum and the relative permittivity, respectively, $k_B$ is the Boltzmann constant and T is temperature.

The ion concentrations may then be calculated using:

$$c_n(r) = c_{n,0} e^{\frac{e\varphi(r)}{k_B T}} \quad c_p(r) = c_{p,0} e^{\frac{e\varphi(r)}{k_B T}}. \quad (9a, b)$$

Electrical impedance may be parameterized in terms of pore parameters by using the new definition of effective mobility, which depends on the ion concentration and on the pore radius. The derived pore parameter can then be used to calculate hydraulic parameters such as permeability.

Effective mobility may be defined as:

$$\mu_{\mathit{eff}} = \mu \cdot \bar{c}/c_0$$

for both p and n, and then use this in eqn. (4,a,b). In some cases, it may be desirable to use effective mobilities without an intermediate calculation of effective transference numbers.

In some embodiments, a generalized method (i.e. without averaged ion concentrations may be used after defining a generalized parameter q as:

$$q = \frac{1}{A_p} \int_{A_p} w(r) dA,$$

where w is a generalized weighting function, and then use q instead of μ in eq. (4). In the case of w=c(r), this is equivalent to eqn. (10) and (11).

The transference numbers typically only depend on ion mobility. However, transference numbers may be estimated using ion mobility and ion concentration, hereinafter referred to as "effective transference numbers." Effective transference numbers may be expressed as:

$$\tilde{t}_p = \frac{\mu_p \overline{c}_p}{\mu_p \overline{c}_p + \mu_n \overline{c}_n}; \tilde{t}_n = \frac{\mu_n \overline{c}_n}{\mu_p \overline{c}_p + \mu_n \overline{c}_n} \quad (10a, b)$$

where $\overline{c}$ may be average ion concentration, where the averaging is carried out over the section of the pore. The average may be weighted by any suitable weighting function.

The average ion concentrations may be obtained by integrating the concentrations given by eqn. (9a,b) over the area of the pore. For a pore system consisting of 2 cylinders with different radii, the (non-weighted) average concentration may be given by $$\overline{c}_{p,n} = \frac{1}{A_p} \int_{A_p} c_{p,n}(r) dA = \frac{c_0}{A_p} \int_{A_p} e^{\mp \frac{e\varphi(r)}{k_B T}} dA \quad (11)$$

where the full sectional area $A_p$ of the larger pores may be used for the normalization.

Thus, using the average ion concentrations, the electrical impedance spectra for an earth formation may be estimated. By using the estimated potential in base pore geometry and eqns. (11) and (10 a, b) and inverting eqn. (1) by the electrical impedance information estimated by a sensor in the borehole, pore parameters may be estimated. Embodiments of apparatuses and methods for electrical impedance spectra and pore parameters are discussed below.

FIG. 1 shows an electrical impedance tool 10 suspended in a borehole 12 penetrating earth formation 13 from a suitable cable 14 that passes over a sheave 16 mounted on drilling rig 18. The electrical impedance tool 10 is raised and lowered by draw works 20. Electronic module 22, on the surface 23, transmits the required operating commands downhole and in return, receives data back which may be recorded on an archival storage medium of any desired type for concurrent or later processing. The data may be transmitted in analog or digital form. Information analysis may be performed in the field in real time using one or more processors, such as a suitable computer 24, the recorded information may be sent to a processing center, or both. Some or all of the processing may also be done by using a downhole processor at a suitable location on the tool 10. While a wireline conveyance system has been shown, it should be understood that embodiments of the present disclosure may be utilized in connection with tools conveyed via rigid carriers (e.g., jointed tubular or coiled tubing) as well as non-rigid carriers (e.g., wireline, slickline, e-line, etc.). Some embodiments of the present disclosure may be deployed along with LWD/MWD tools.

Figure 2:
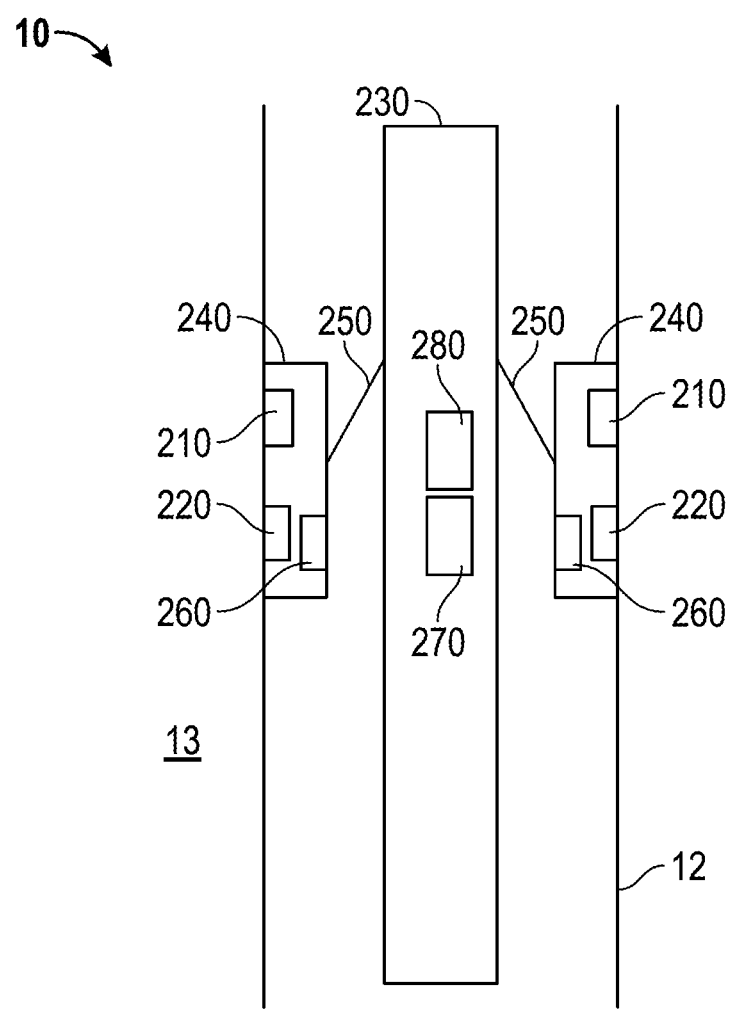
FIG. 2 is a schematic view of an electrical impedance tool in accordance with one embodiment of the present disclosure.

FIG. 2 shows an electrical impedance tool 10 for one embodiment according to the present disclosure. The electrical impedance tool 10 may include at least two electrodes 210, 220 configured to apply an electric current to the earth formation 13. Measure electrode 210 may be configured to inject the electrical current into the earth formation, and return electrode 220 may be configured to act as a current return. In drilling embodiments, the mandrel (not shown) may act as the return electrode. The electrical impedance tool 10 may include a body 230 with two pads 240 extended on extension devices 250. The pads 240 may be configured to receive the electrodes 210, 220. In some embodiments, at least part of the pad 240 may be the return electrode 220. Two pads are shown for illustrative purposes and, in actual practice, there may be more pads. The pads and extension devices are optional. The extension devices 250 may be electrically operated, electromechanically operated, mechanically operated, or hydraulically operated. With the extension devices 250 fully extended, the pads 240 can make contact with the borehole wall 12 and make measurements indicative of properties of the earth formation 13.

Sensors 260 associated with the electrodes 210, 220 may be configured to estimate the impedance of the formation based on the current flow through the electrodes 210, 220. Sensors 260 may be disposed in the pads 240. The tool 10 may also include a power supply 270. The power supply 270 may be configured to generate electric current for the electrodes 210, 220. The power supply 270 may be configured to generate an alternating electric current at a plurality of frequencies. In some embodiments, the plurality of frequencies may include a range of about 0.01 Hz to about 10 kHz. In some embodiments, the plurality of frequencies may include frequencies above 10 kHz. The power supply 270 may be configured to generate electric current in the form of a pulse or a step function. The body 230 may house a downhole processor 280 configured to estimate the parameter of interest. The downhole processor 280 may be configured to store information from sensors 260 to a storage medium (not shown). In some embodiments, the processor may be located at the surface (not shown). Orientation sensors (not shown) may provide an indication of the orientation of the electrical impedance tool 10. The orientation sensors may include one or more of: i) an accelerometer, ii) a magnetometer, and iii) a gyroscope. In addition, cable depth measurements may be obtained using a sensor (not shown) at the surface that measures the amount of cable spooled out. In addition, accelerometers may be used downhole to provide other measurements indicative of the depth of the electrical impedance tool 10. Depth may also be estimated from a gyroscope output.

Figure 3:
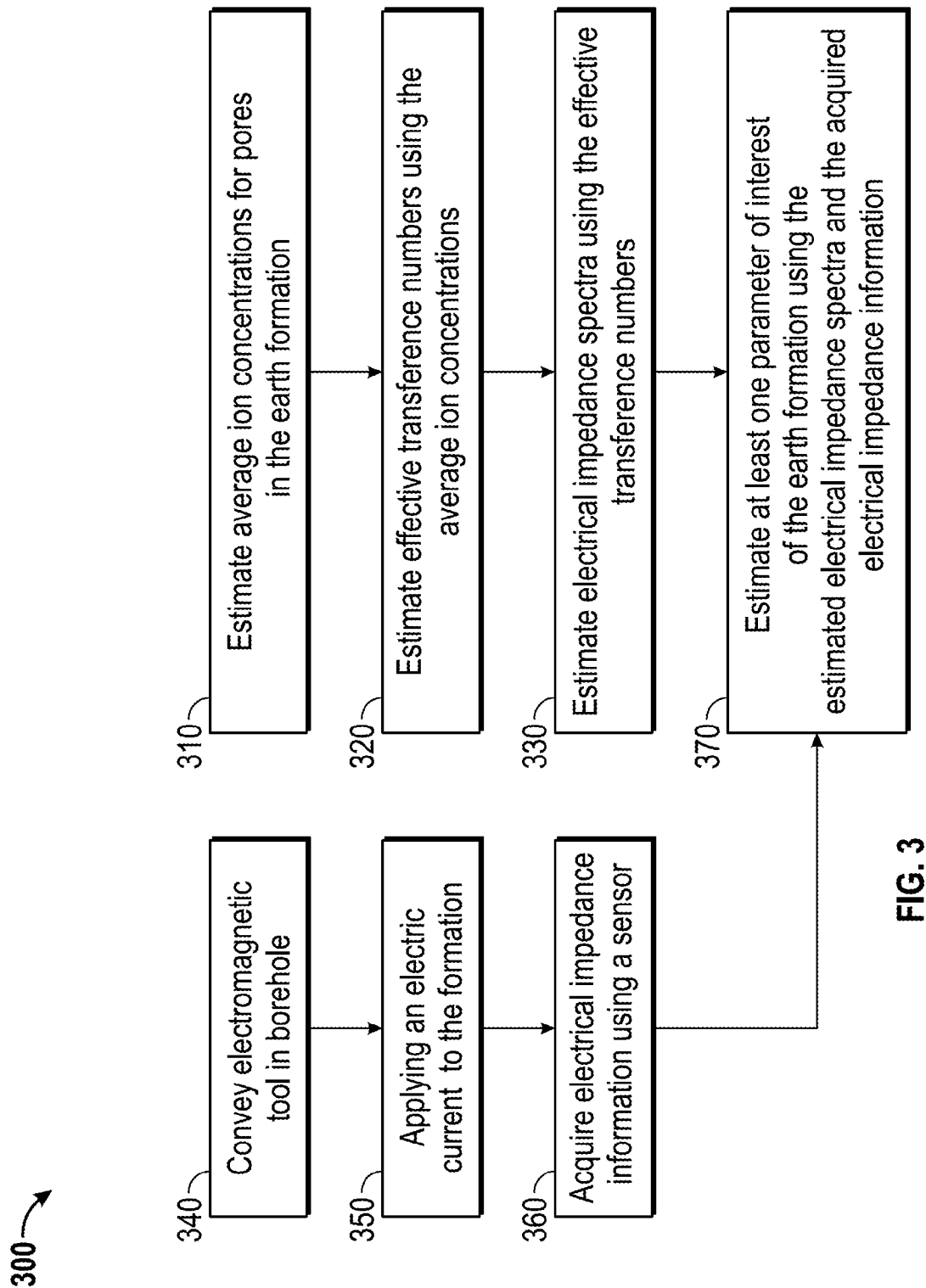
FIG. 3 is a flow chart for a method for one embodiment according to the present disclosure.

FIG. 3 is a flow chart of one method 300 for estimating an electrical impedance spectra according to one embodiment of the present disclosure. In step 310, average ion concentrations for positive and negative ions in pores of an earth formation 13 may be estimated. The average ion concentrations may be estimated using eqn. (11) for a selected base pore geometry (e.g. cylinder, spheres). The average ion concentration may be estimated using temperature and salinity logs for the earth formation. In some embodiments, the concentration distribution inside the pores may be modeled using eqns. (7-9)—eqns. (7) and (8) hold for cylindrical pores, however, other base pore geometries such as spheres can be used as well. In some embodiments, a weighting factor may be used in the estimation of the average ion concentrations. In step 320, effective transference numbers may be estimated using the average ion concentrations. The effective transference numbers may be estimated using eqns. (10a,b). In step 330, electrical impedance spectra may be estimated for the earth formation 13 using the effective transference numbers. The electrical impedance spectra may be estimated using eqn. (1) with effective transference numbers from eqns. (10a,b).

Once the electrical impedance spectra has been estimated, parameters relating to pore geometry may be estimated by comparing the electrical impedance spectra based on the model with actual measurements. In step 340, electrical impedance tool 10 may be conveyed in the borehole 12. In step 350, electrodes 210, 220 may be used to apply an electric current to the earth formation. In some embodiments, the electric current may be an alternating current applied at a plurality of frequencies. In other embodiments, the electric current may include at least one of: (i) a pulse and (ii) a current step. In step 360, the electrical impedance information may be estimated using a sensor configured to estimate impedance between electrodes 210 and 220. In step 370, at least one parameter of interest of the earth formation may be estimated using the electrical impedance information and the electrical impedance spectra estimated using the average ion concentrations. The at least one parameter of interest may include, but is not limited to, one or more of: (i) pore size, (ii) permeability, (iii) pore size distribution, (iv) specific surface area, (v) grain size, (vi) grain size distribution, (vii) cation exchange capacity, (viii) electric permittivity, and (ix) water saturation.

In some embodiments, step 320 may be performed using ion mobilities instead of estimated transference numbers. In some embodiments, step 370 may include reducing a difference between the estimated impedance information and the estimated electrical impedance spectra by varying one or more of the pore parameters used in the estimating the electrical impedance spectra. One or more of the pore parameters may be included in the at least one parameter of interest. The pore parameters may include, but are not limited to, one or more of: (i) pore size, (ii) permeability, (iii) pore size distribution, (iv) specific surface area, (v) grain size, (vi) grain size distribution, (vii) cation exchange capacity, (viii) electric permittivity, and (ix) water saturation. In some embodiments, step 370 may include varying the values of effective transference numbers. In embodiments of the method involving estimating the electrical impedance spectra, steps 340-370 may be optional.

As described herein, the methods of the disclosure, in accordance with the presently disclosed embodiment, may involve several computational steps. As would be apparent by persons of ordinary skill, these steps may be performed by computational means such as a computer, or may be performed manually by an analyst, or by some combination thereof. As an example, where a disclosed embodiment calls for selection of measured values having certain characteristics, it would be apparent to those of ordinary skill in the art that such comparison could be performed based upon a subjective assessment by an analyst or by computational assessment by a computer system properly programmed to perform such a function. To the extent that the present disclosure is implemented utilizing computer equipment to perform one or more functions, it is believed that programming computer equipment to perform these steps would be a matter of routine engineering to persons of ordinary skill in the art having the benefit of the present disclosure.

Implicit in the processing of the acquired data is the use of a computer program implemented on a suitable computational platform (dedicated or general purpose) and embodied in a suitable machine readable medium that enables the processor to perform the control and processing. The term "processor" as used in the present disclosure is intended to encompass such devices as microcontrollers, microprocessors, field-programmable gate arrays (FPGAs) and the storage medium may include ROM, RAM, EPROM, EAROM, solid-state disk, optical media, magnetic media and other media and/or storage mechanisms as may be deemed appropriate. As discussed above, processing and control functions may be performed downhole, at the surface, or in both locations.

From the foregoing disclosure, it should be apparent that a method and apparatus for evaluating an earth formation has been disclosed involving the measurement of electrical impedance spectra and pore parameters and involving measurements taken at a plurality of measurement frequencies.

Although a specific embodiment of the disclosure as well as possible variants and alternatives thereof have been described and/or suggested herein, it is to be understood that the present disclosure is intended to teach, suggest, and illustrate various features and aspects of the disclosure, but is not intended to be limiting with respect to the scope of the disclosure, as defined exclusively in and by the claims, which follow.

While the foregoing disclosure is directed to the specific embodiments of the disclosure, various modifications will be apparent to those skilled in the art. It is intended that all such variations within the scope of the appended claims be embraced by the foregoing disclosure.

What is claimed is:

1. A method of estimating electrical impedance spectra of an earth formation, comprising:
    estimating average ion concentrations in pores within the earth formation by selecting the estimated average from at least one (a) integrating ion concentrations over an area of at least one pore of the pores within the earth formation, (b) using temperature and salinity logs for the earth formation, and (c) integrating a weighting function over the area of the at least one pore of the pores within the earth formation;
    estimating effective transference numbers of ions in the pores using the average ion concentrations and ion mobility values; and
    using at least one processor to estimate the electrical impedance spectra by using the effective transference number of ions in the pores and a one dimensional model of pore spaces.

2. The method of claim 1, wherein the average ion concentrations are estimated using a formula:

$$\overline{c}_{p,n} = \frac{1}{A_p} \int_{A_p} c_{p,n}(r)\, dA = \frac{c_0}{A_p} \int_{A_p} e^{\mp \frac{e\varphi(r)}{k_B T}}\, dA,$$

where $A_p$ is area of the pore, r is pore radius, $c_0$ is an equilibrium ion concentration, $k_B$ is Boltzmann's constant, T is temperature, and e is elementary charge.

3. The method of claim 1, wherein the effective transference numbers include:

$$\tilde{t}_p = \frac{\mu_p \overline{c}_p}{\mu_p \overline{c}_p + \mu_n \overline{c}_n} \text{ and } \tilde{t}_n = \frac{\mu_n \overline{c}_n}{\mu_p \overline{c}_p + \mu_n \overline{c}_n},$$

where $\mu_p$ is positive ion mobility, $\mu_n$ is negative ion mobility, $\overline{c}_p$ is average positive ion concentration, and $\overline{c}_n$ is average negative ion concentration.

4. The method of claim 1, further comprising:
acquiring electrical impedance information for the earth formation; and
estimating at least one parameter of interest of the earth formation using the estimated electrical impedance spectra and the acquired electrical impedance information.

5. The method of claim 4, wherein estimating the at least one parameter of interest of the earth formation comprises:
reducing a difference between the estimated electrical impedance spectra and the acquired electrical impedance spectra by varying at least one pore parameter used in estimating the electrical impedance spectra.

6. The method of claim 5, wherein the at least one pore parameter may include at least one of: (i) pore size, (ii) permeability, (iii) pore size distribution, (iv) specific surface area, (v) grain size, (vi) grain size distribution, (vii) cation exchange capacity, (viii) electric permittivity, and (ix) water saturation.

7. The method of claim 4, wherein acquiring electrical impedance information comprises:
applying an electric current to the earth formation; and
estimating the acquired electrical impedance information using a sensor.

8. The method of claim 7, wherein the electric current is an alternating electric current applied at a plurality of frequencies.

9. The method of claim 7, wherein the electric current includes at least one of: (i) a pulse and (ii) a step.

10. The method of claim 7, further comprising:
conveying the sensor in the borehole.

11. The method of claim 4, wherein the at least one parameter of interest includes at least one of: (i) pore size, (ii) permeability, (iii) pore size distribution, (iv) specific surface area, (v) grain size, (vi) grain size distribution, (vii) cation exchange capacity, (viii) electric permittivity, and (ix) water saturation.

12. A method of estimating at least one parameter of interest of an earth formation, comprising:
estimating effective transference numbers of ions in the earth formation using electrical impedance information obtained using a sensor in a borehole penetrating the earth formation and a one dimensional model of electrical impedance spectra of the earth formation;
estimating pore parameters using the effective transference numbers of ions in the earth formation and a model of average ion concentrations in pores of the earth formation; and
estimating the at least one parameter of interest using the pore parameters, wherein the at least one parameter of interest includes at least one of: (i) pore size, (ii) permeability, (iii) pore size distribution, (iv) specific surface area, (v) grain size, (vi) grain size distribution, (vii) cation exchange capacity, (viii) electric permittivity, and (ix) water saturation.

13. The method of claim 12, further comprising:
applying an electric current to the earth formation; and
estimating the electrical impedance information.

14. The method of claim 13, wherein the electric current is an alternating electric current applied at a plurality of frequencies.

15. The method of claim 13, wherein the electric current includes one of: (i) a pulse and (ii) a step.

16. The method of claim 12, further comprising:
conveying the sensor in the borehole.

17. An apparatus for estimating at least one parameter of interest of an earth formation, comprising:
a carrier configured for conveyance in a borehole penetrating the earth formation;
an electrode pair disposed on the carrier and configured to apply an electric current to the earth formation;
a power supply in electrical communication with the electrode pair and configured to generate the electric current;
a sensor associated with the electrode pair and configured to estimate electrical impedance information of the earth formation;
at least one processor configured to estimate the at least one parameter of interest using the electrical impedance information and a model of electrical impedance spectra of the earth formation estimated using average ion concentrations in pores of the earth formation.

18. The apparatus of claim 17, wherein the electric current is an alternating electric current.

19. The apparatus of claim 17, wherein the electric current includes at least one of:
(i) a pulse and (ii) a step.

20. The apparatus of claim 17, wherein the power supply is configured to generate the electric current over a plurality of frequencies.

21. The apparatus of claim 17, wherein the at least one parameter of interest includes at least one of: (i) pore size, (ii) permeability, (iii) pore size distribution, (iv) specific surface area, (v) grain size, (vi) grain size distribution, (vii) cation exchange capacity, (viii) electric permittivity, and (ix) water saturation.

* * * * *